(12) United States Patent
Kralik

(10) Patent No.: US 6,666,502 B2
(45) Date of Patent: Dec. 23, 2003

(54) SLIDING ROOF DEVICE WITH A SLIDING HEAD LINER

(75) Inventor: Martin Kralik, Weilheim (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/229,293

(22) Filed: Aug. 28, 2002

(65) Prior Publication Data

US 2003/0057738 A1 Mar. 27, 2003

(30) Foreign Application Priority Data

Aug. 30, 2001 (DE) .......................... 101 42 078

(51) Int. Cl.$^7$ ................................. B60J 7/043
(52) U.S. Cl. ....................................... 296/214
(58) Field of Search ................................ 296/214

(56) References Cited

U.S. PATENT DOCUMENTS

| 3,960,404 A | * | 6/1976 | Bienert | |
| 4,179,156 A | * | 12/1979 | Huisman | |
| 4,679,846 A | * | 7/1987 | Lux et al. | 296/214 |
| 4,717,199 A | * | 1/1988 | Kohlpaintner et al. | 296/214 |
| 4,813,737 A | * | 3/1989 | Schlapp | 296/214 |
| 4,869,548 A | * | 9/1989 | Nagata et al. | 296/221 |
| 4,883,311 A | * | 11/1989 | Kohlpaintner et al. | 296/213 |
| 6,309,013 B1 | | 10/2001 | Staltmayer et al. | |

FOREIGN PATENT DOCUMENTS

| DE | 44 36 941 C1 | 5/1996 |
| DE | 199 62 093 C1 | 2/2001 |

\* cited by examiner

*Primary Examiner*—Dennis H. Pedder
(74) *Attorney, Agent, or Firm*—Nixon Peabody LLP; David S. Safran

(57) ABSTRACT

A sliding roof device for a motor vehicle roof with a movable cover (14) for selectively closing or at least partially exposing a roof opening (15) in the motor vehicle roof, the cover being raisable into a ventilation position at its rear edge, and with a sliding headliner (1) which is movably located underneath the cover (14) and which, when positioned under the cover (14) in its raised position, is raised at its rear section for creating a ventilation gap. A lifting mechanism engages the rear section (25) of the sliding headliner (1), with a lifting force which pretensions the rear section (25) into its folded-up position.

9 Claims, 10 Drawing Sheets

SLIDING ROOF DEVICE WITH A SLIDING HEAD LINER

BACKGROUND OF THE INVENTION

1. Field of the Invention

This invention relates to a sliding roof device for a motor vehicle roof with a movable cover for selectively closing or at least partially exposing a roof opening in the motor vehicle roof, which can be raised into a ventilation position at its rear edge, and which has a sliding headliner movably located underneath the cover, the headliner, when positioned under the raised cover, is raised at its rear section for producing a ventilation gap and is kept in this raised position.

2. Description of Related Art

U.S. Pat. No. 6,309,013 discloses a motor vehicle roof with a roof opening and a sliding roof device in which the sliding headliner is connected to the cover by a catch means and held on it in its folded-up position. If the catch means has a high locking force in order to hold the sliding headliner securely on the cover, manual actuation is made difficult. On the other hand, if a low locking force is utilized, the sliding headliner can be separated from the cover and drop down.

SUMMARY OF THE INVENTION

A primary object of the present invention is to improve the initially mentioned sliding roof device with a sliding headliner such that the sliding headliner is securely held in its folded-up position and actuation of the sliding headliner is still possible without a major expenditure of force.

This object is achieved in accordance with the invention in a sliding roof device of the initially mentioned type sliding roof device in the provision of a lifting means which engages the rear section of the sliding headliner with a lifting force which pretensions the rear section into its folded-up position. While the rear section is being moved by a guide or adjustment means into the folded-up position, the lifting force provides for the rear section to be kept pretensioned along its guide means or adjustment means in the direction of its motion. The lifting force of the lifting means is directed such that at least one component of the lifting force acts in the direction along the guide for the rear section.

In one preferred embodiment, the lifting means has an increased or maximum lifting force with the rear section folded up, and it has a reduced or minimum lifting force with the rear section folded back into the displacement plane of the sliding headliner. In this way, the restoration force of the deformed material of the sliding headliner, which increases when folding up, can be counteracted. On the other hand, in the flat, folded-down arrangement, the frictional resistance is kept low by the minimum force which acts perpendicular to the guide so that the actuation resistance is not increased when the sliding headliner is moved.

If the lifting means is designed such that the lifting force increases continuously when the rear section of the sliding headliner is folded up, the manual displacement of the sliding headliner is facilitated and the end position is continuously approached without the increased catch resistance of a continuous catch means having to be overcome and without catch noise occurring.

One possible embodiment of the guide for the rear section calls for the rear section of the sliding headliner to be guided on an upwardly curved or pivoted guideway into its folded-up position. Transitions or coupling processes are avoided by the continuous guideway. The front section of the sliding headliner can be guided on the guideway in the displacement plane.

Preferably, the lifting means connects the front section and the rear section of the sliding headliner on the top side, and in one simple configuration, applies the lifting force to the rear section by a spring means and especially by means of a tension spring.

In one alternative embodiment, the lifting means has a lever means with a front lever and a rear lever which are pivotally coupled, on the one hand, to the front section and the rear section of the sliding headliner, respectively, and on the other hand, are pivotally connected to one another on a hinge axle, the spring means or the tension spring connecting the rear lever or the hinge axis to the front section. Here, different configurations are possible which increase the spring force which acts as the lifting force when the rear section is folded up.

Embodiments of the sliding roof device are explained in detail below with reference to the accompanying drawings.

DETAILED DESCRIPTION OF THE INVENTION

Figure 1:
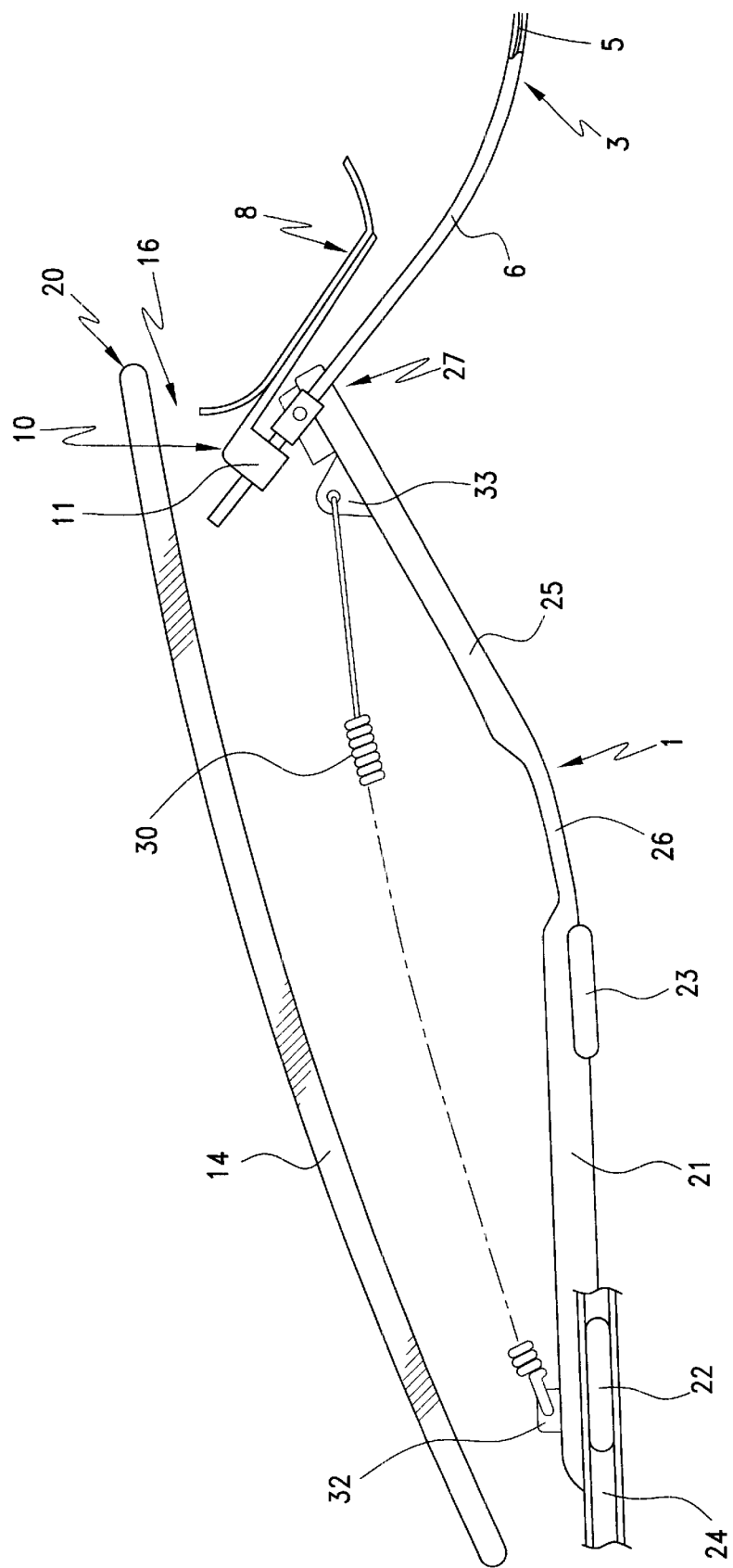
FIG. 1 is a schematic side view of a sliding roof device with a raised cover and a sliding headliner with a lifting spring pretensioning the sliding headliner into its folded-up ventilation position.
Figure 6:
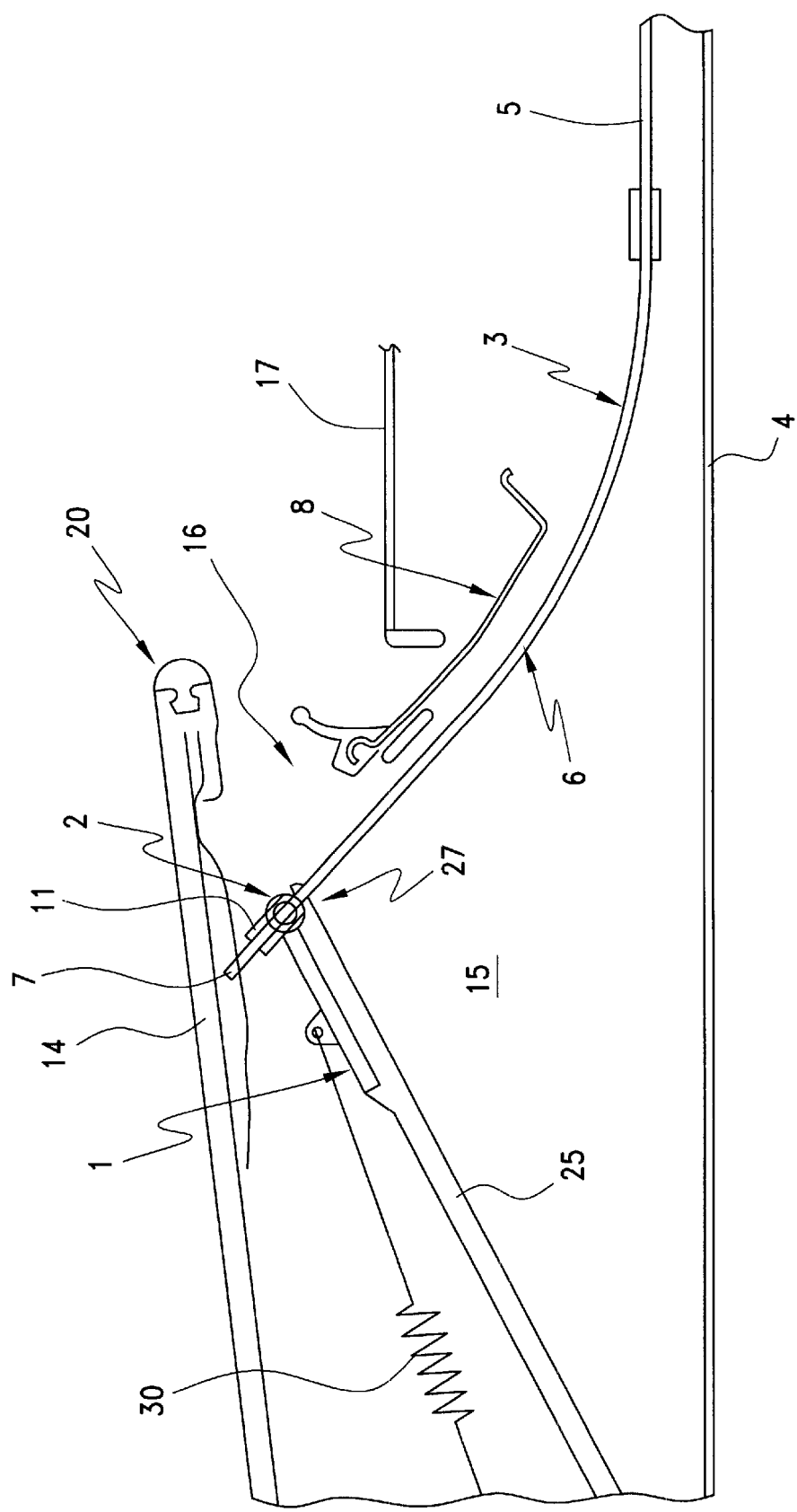
FIG. 6 shows in a lengthwise section the sliding roof device with the raised cover and folded-up sliding head liner.

A sliding roof device for a motor vehicle roof contains a cover 14 for closing the roof opening 15 formed in the motor vehicle roof 17 (see FIGS. 1 & 6). The cover 14 is preferably a transparent cover, especially a glass cover, and can be raised in a conventional manner at its rear edge 20 into a ventilation position and can be moved in a lowered position on guides 4 to the rear to under the fixed roof skin in order to at least partially or entirely expose the roof opening 15. One such cover 14 is disclosed, for example, in the initially mentioned U.S. Pat. No. 6,309,013.

Figure 5:
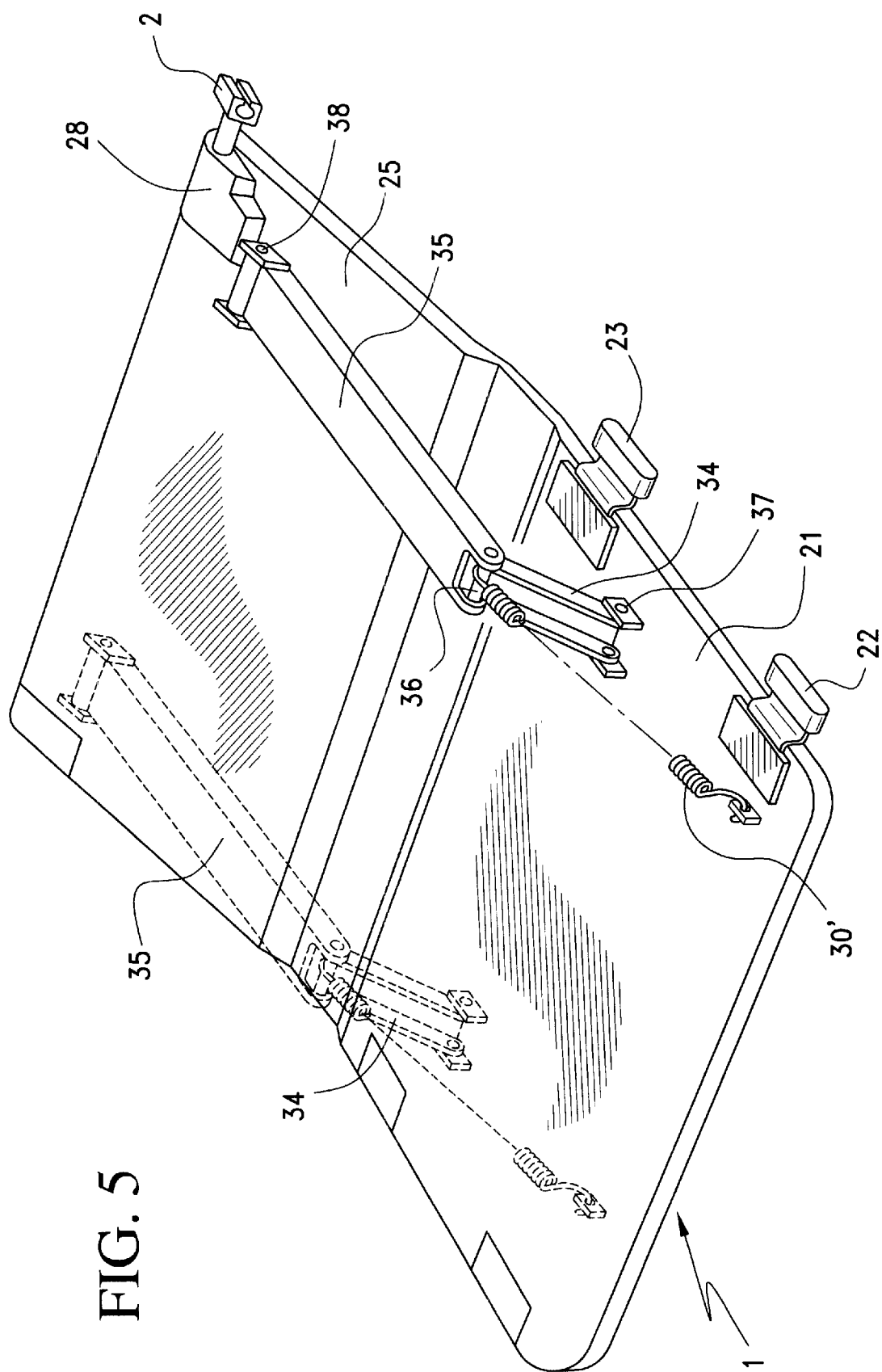
FIG. 5 is a perspective overhead view of the sliding headliner with the second embodiment of the lifting device.

The headliner part or sliding headliner 1 is movably supported underneath the cover 14 and is located in its closed position under the cover 14 and the roof opening 15 for reducing the incidence of light. The sliding headliner 1, which is produced, for example, from PU foam, contains a front section 21 which is movably guided on the respective guide rail 24 via two lateral sliders 22, 23, and a rear section 25 which is connected to the front section 21 via a flexible intermediate section 26 which extends transversely across the sliding headliner 1. Via the flexible intermediate section 26, the rear section 25 can be swung or folded up relative to the front section 21 so that a ventilation gap 16 is created between the raisable rear edge 27 of the sliding headliner 1 or of the rear section 25 and the fixed motor vehicle roof 17. In the area of the rear edge 27, on each lateral side of the rear section 25, a respective holding device 28 with a slider 2 is attached (only the mounting spot for the second holding device 28 being shown in FIG. 5). The headliner guide 3 is supported on the slider 2 (see FIG. 6) and can be swung up at its front section 6 so that the slider 2 guided on the swung-up front section 6 raises the rear edge 27 of the rear section 25 of the sliding headliner 1, and thus, swings the rear section 25 up around the flexible intermediate layer 26, the swinging up taking place against the elastic force of the material of the sliding headliner 1, which force opposes deformation, and especially the restoration force of the material must be overcome when the sliding headliner 1 is arched slightly in the transverse direction.

According to the embodiment described below, the headliner guide 3 is formed of a metal rod which is coated with plastic and which has a roof-mounted section 5 and a flexibly formed front section 6 with a movable end 7.

A water gutter 8 is assigned to the cover 14 and catches the water penetrating into the ventilation gap 16, which has been created by the raised rear edge 20 of the cover 14, and can divert it into lateral gutters on the frame of the sliding roof device. The gutter 8 moves with the cover 14 into its respective position. The movements of the cover 14 are controlled by a known lever rod 9 which is driven via a lifting lever 29 with a guide slot which can be recognized on the right edge in FIG. 7.

A control lever 10 is securely attached to the gutter 8; on the end of control lever 10 which is forwardmost and furthest from the gutter 8, there is a driver 11 which is either movably held so as to be pivotable around a horizontal axis (see FIGS. 7 to 10) or is securely connected to the control lever 10 (FIG. 1). By moving the gutter 8 via the control lever 10 and the driver 11, the movable end 7 of the headliner guide 3 is entrained into its raised position when the cover 14 moves, as is apparent especially from FIGS. 8 & 9. In doing so, the driver 11 remains in the end area of the movable end 7 of the headliner guide 3. Therefore, the slider 2, which is movably supported likewise on the headliner guide 3, can be moved with the sliding headliner 1 along the headliner guide 3 until it adjoins the driver 11 (see FIGS. 1 & 8). Here, the headliner guide 3 forms a path of varied shape with its flexible front section 6, between the securely mounted area 5 and the movable end 7, depending on the location of the control lever 10. When the cover 14 is closed or has been moved in the direction of its open position (compare FIGS. 7 & 10), this path is straight, so that the sliding headliner 1 can be pushed in two directions between its pushed-back open position under the motor vehicle roof 17 and the closed position which is determined by striking the driver 11. This takes place manually in this embodiment using an interior-side handle trough which is not shown on the headliner part 1; However, there can also be a power drive for moving the headliner part 1.

The rearmost end of the gutter 8 with respect to the motor vehicle roof is coupled to a guide shoe which is hidden in FIGS. 7 to 10 and which can be moved along the guide rails 4 and forms part of the movement mechanism of the cover 14. The front edge of the cover 14 is likewise movably supported along the guide rails 4.

Figure 8:
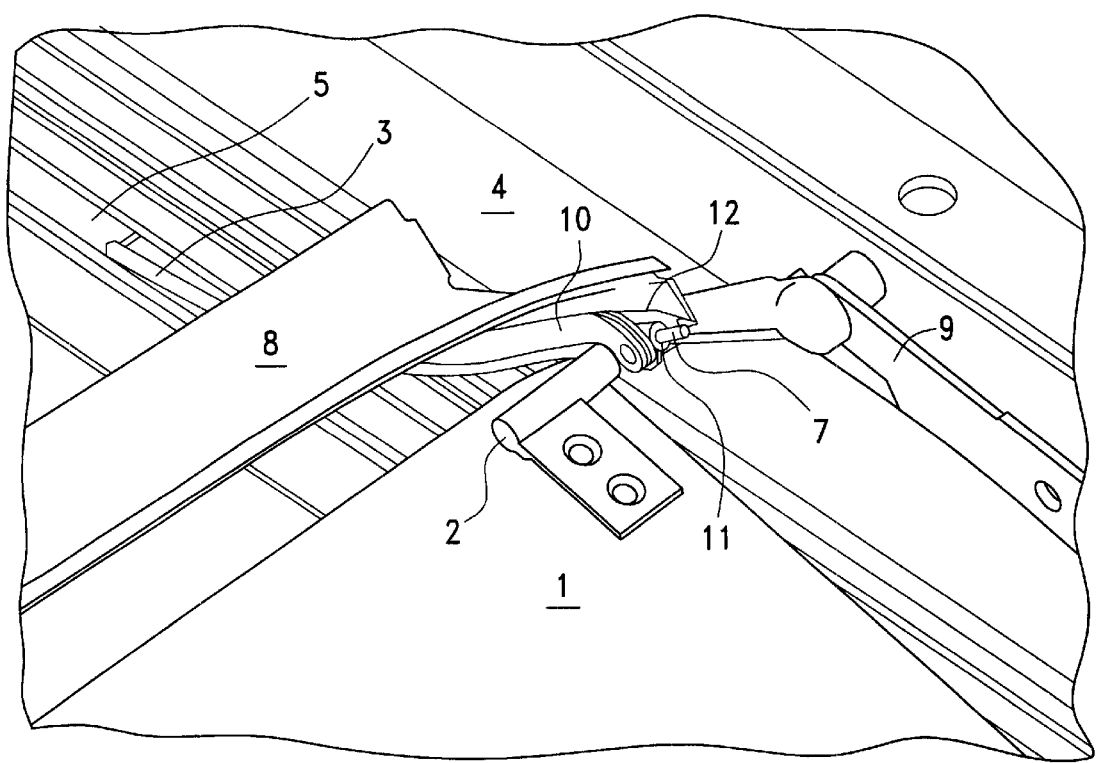
FIG. 8 is a view corresponding to that of FIG. 7, but showing the sliding roof device with the sliding headliner in a raised position as can occur with the cover raised.

When the control lever 10 is tilted by raising the cover 14, the flexible front section 6 of the headliner guide 3 is curved (see FIGS. 1 & 8). The movable end 7 remains straight as a result of stiffening by a stiffening structure 12 which is attached in this area on the side of the guide element 3 facing away from the control lever 10. Here, this stiffening structure is, for example, preferably an injected plastic part provided with a plastic coating.

The headliner guide 3, which is integral with fixed section 5 and its flexible front section 6 is preferably a flexible steel rod or leaf spring which is extrusion coated with plastic, attachment to the motor vehicle roof in the fixed section 5 taking place via an injected plastic mounting element.

Figure 7:
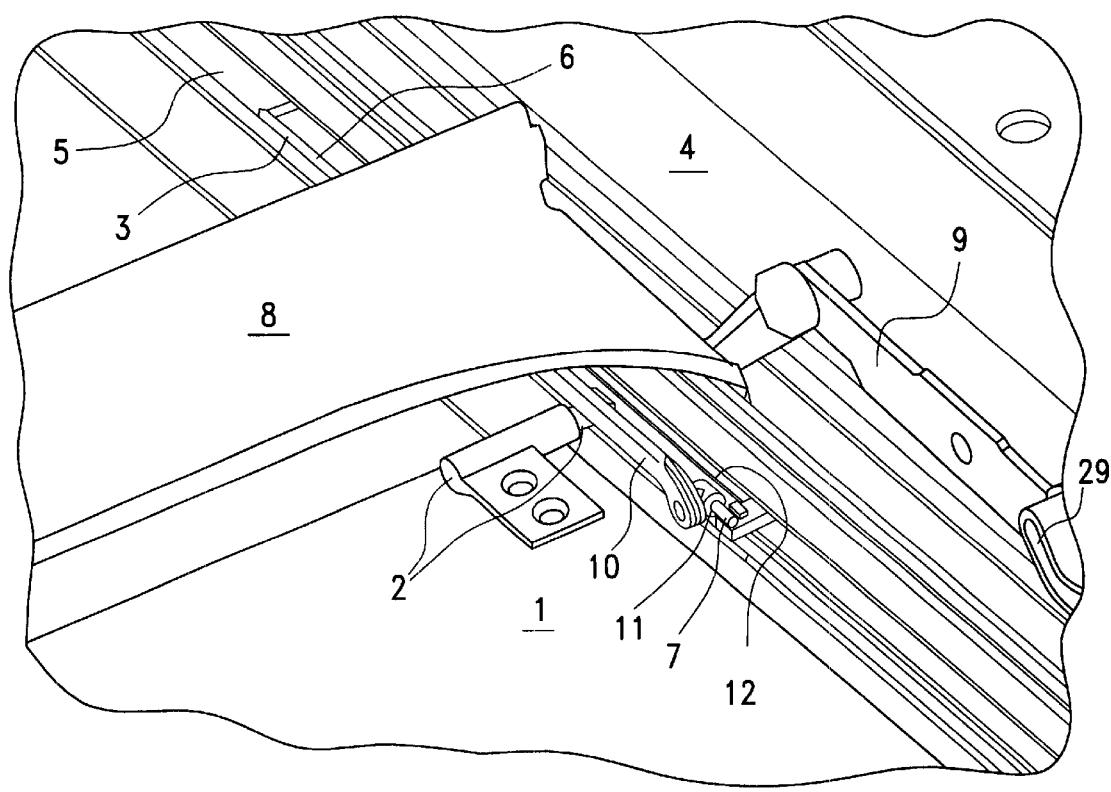
FIG. 7 is a partial perspective view of the sliding roof device with the sliding headliner closed, in a position corresponding to the closed cover position.
Figure 9:
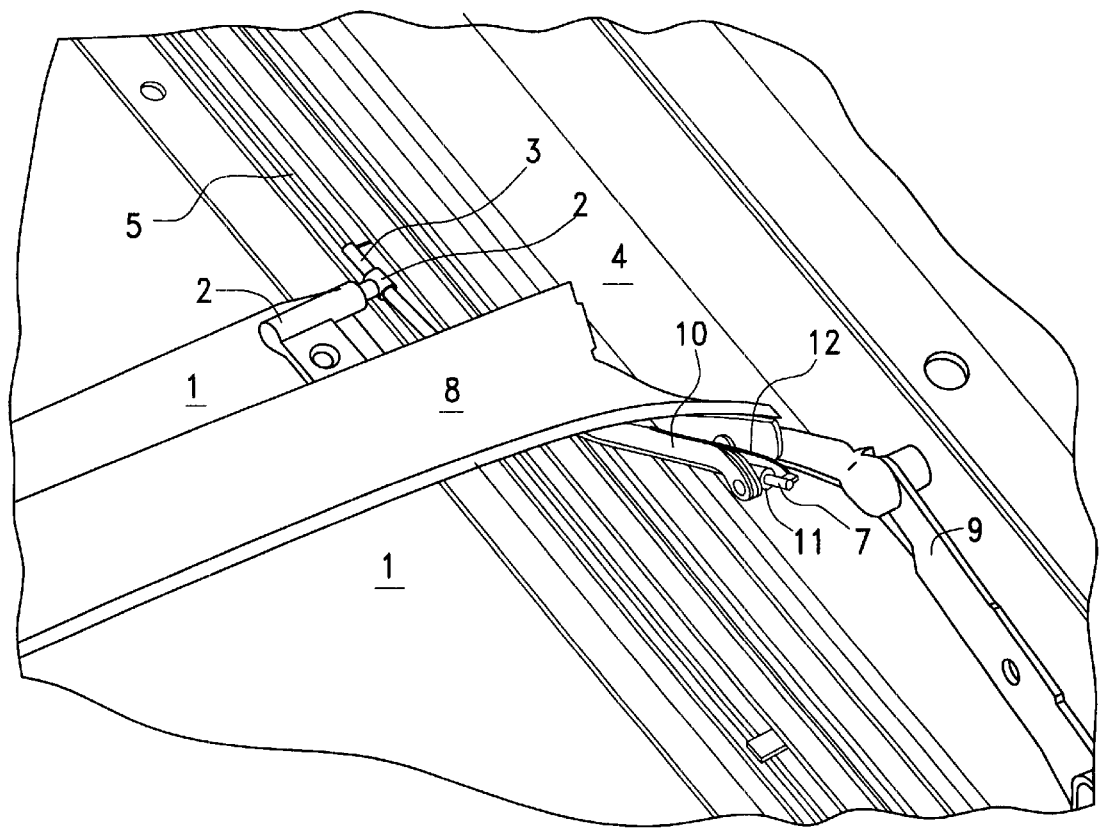
FIG. 9 is a view corresponding to that of FIG. 7, but showing the sliding roof device with the sliding headliner being pushed back in the direction to its open position; as can occur with the cover raised.

Based on this configuration, the cover 14 entrains the sliding headliner 1 in the raising motion from the closed position as shown in FIG. 7 into the raised position as shown in FIG. 8, and the sliding headliner 1 can be pushed out of its raised position in the direction to the open position (from FIG. 8 to FIG. 9), FIG. 9 showing the intermediate stage of motion into the completely open position.

Figure 10:
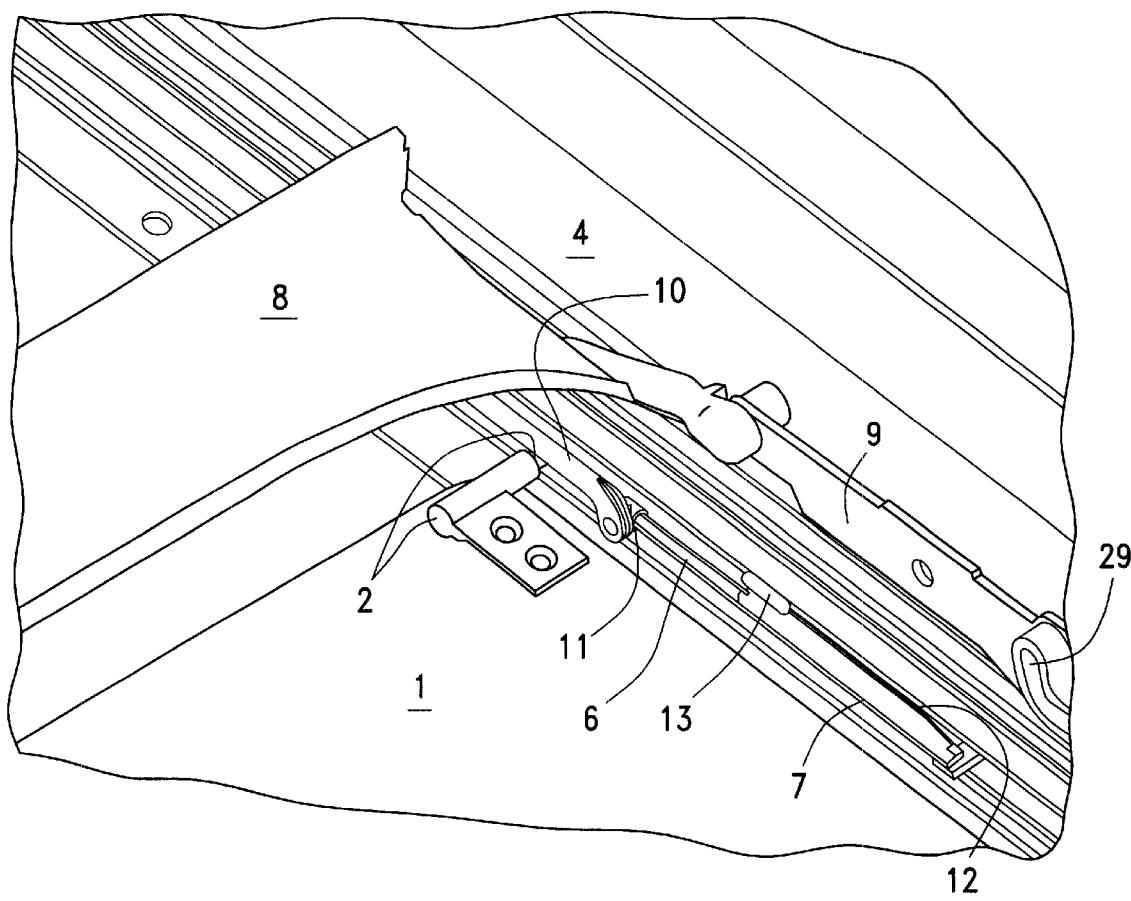
FIG. 10 is a view corresponding to that of FIG. 7, but showing the sliding roof device in a position occurring when the cover and the sliding headliner have been moved in the direction toward their open positions.

FIG. 10 shows, in comparison to FIG. 7, how the cover 14 can be moved out of its closed position in FIG. 7 in the direction toward its open position. In doing so, first, the cover 14 is lowered somewhat in order to be able to be pushed under the fixed motor vehicle roof 17; this can be seen on the position of the lever rod 9 which is flatter in FIG. 10 compared to FIG. 7. Moreover, the driver 11 is already removed somewhat from the tip of the movable end 7 of the headliner guide 3. It is also apparent that the driver 11, in this motion, can entrain the slider 2, and thus, the sliding headliner 1, even if in FIG. 10, for the sake of clarity, no direct contact between the driver 11 and the slider 2 is shown.

When the sliding headliner 1 is pushed into its closed position to under the cover 14, and the rear section 25, with the cover 14 raised, is folded up, due to vibrations in driving, the rear section 25 moves down as a result of the indicated material tension on the deformed intermediate section 26 and to a certain extent also by its weight, since this restoration force is smaller than the sliding frictional force of the sliders 22, 23, and 2 on their guides. In this way, the slider 2 would slide to the rear obliquely downwards on the upwardly bent front section 6 of the headliner guide 3, and thus, pulls the sliding headliner 1 to the rear, if conversely no measure is taken. Instead of a conventional catch means, which could be arranged especially on the front section 21 of the sliding headliner 1, and for example, on the guide 24, and which could stop the displacement of the sliding headliner 1 by secure catching, it is provided, in accordance with the invention, that a lifting means applies a holding or lifting force to the rear section 25 in this direction of action so that it is pressed in that direction against the driver 11 of the gutter 8 and can also directly adjoin it.

Figure 2:
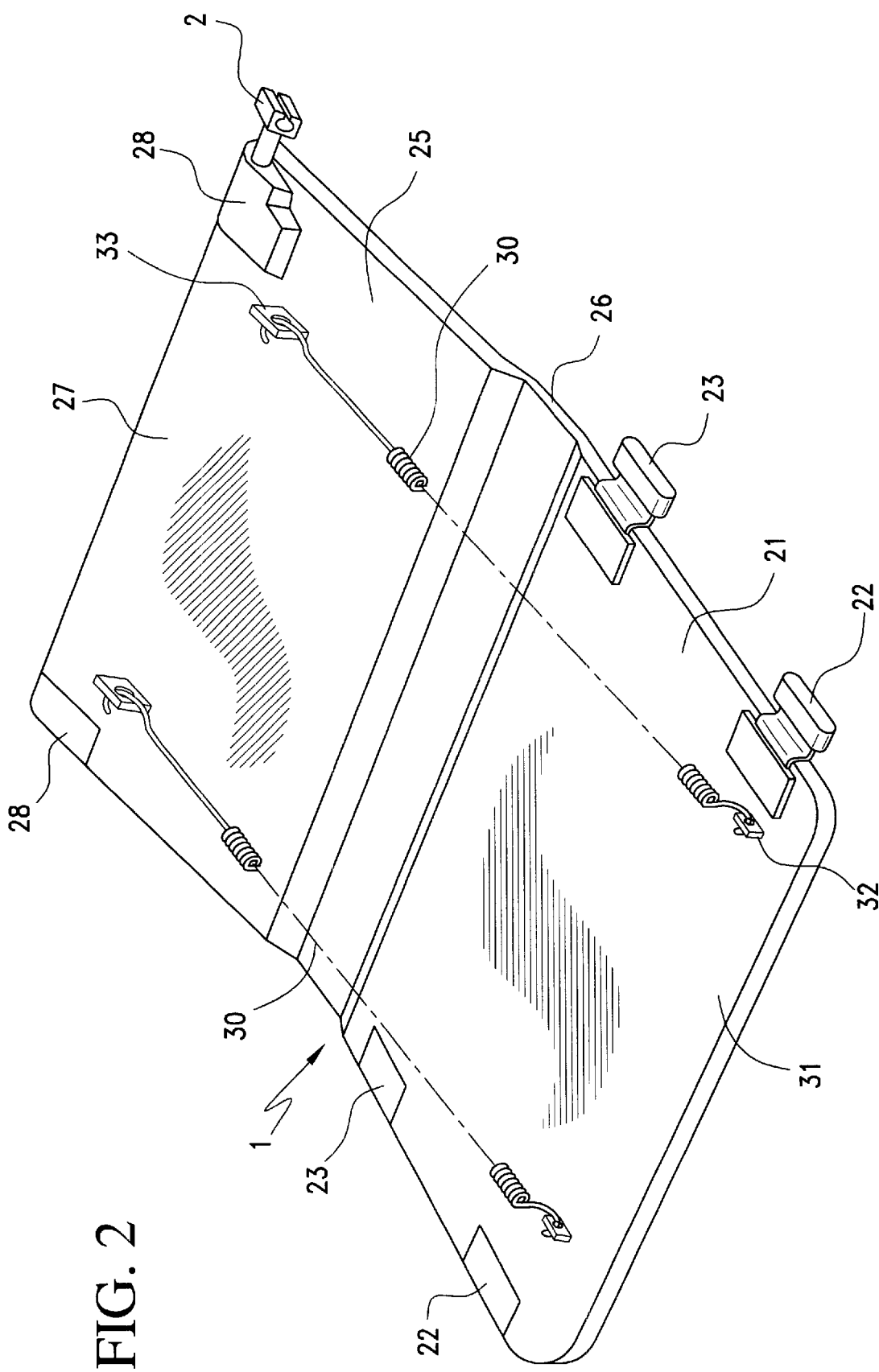
FIG. 2 is a perspective overhead view of the sliding headliner with the lifting springs.

The lifting means according to a first embodiment (see FIGS. 1 & 2) contains a tension spring 30 which, on the one hand, is supported in the area of the forward edge 31 of the front section 21, and on the other hand, in the area of the rear edge 27 of the rear section 25, is supported on the top of the sliding headliner 1, for example, on the front holding part 32 and the rear holding part 33, which are foamed in the PU foam material of the sliding headliner 1 and project upward. When the sliding headliner 1 is pushed to the rear and with the rear section 25 folded down is located entirely in the displacement plane along the guides 24, the tension spring 30 is expanded most strongly so that the tension force in the lengthwise direction of the tension spring 30 is maximum. The component of the tension spring force or the swinging force directed upward is, however, low or minimum as a result of the directions of the force so that manual displacement of the sliding headliner 1 is not made more difficult by high frictional forces on the slider 2.

When the sliding headliner 1 is pushed forward with the cover 14 raised, the rear slider 2 swings the rear section 25 upward, the tension spring 30 being shortened, but due to the increasing distance of the tension spring 30 from the intermediate section 26 and the changing lever, and force ratios that force the component which swings the rear section 25 up increase continuously, until, as shown in FIG. 1, the rear slider 2 adjoins the driver 11 of the gutter 8. The tension force of the tension spring 30 thus presses the sliding headliner 1 counter to the material tension or restoration force and the force of the weight of its rear section 25 into the folded-up ventilation position so that catching on the front section 21 of the sliding headliner 1 is not necessary. Since the tension spring 30 is supported at each end on the sliding headliner 1, support on the motor vehicle roof or the roof-mounted part or necessary coupling of the force is not necessary, so that operationally-reliable behavior is achieved.

The lifting means can have a single centrally positioned tension spring 30, two tension springs 30 located in parallel (see FIG. 2) or even more than two tension springs connected in parallel.

Figure 3:
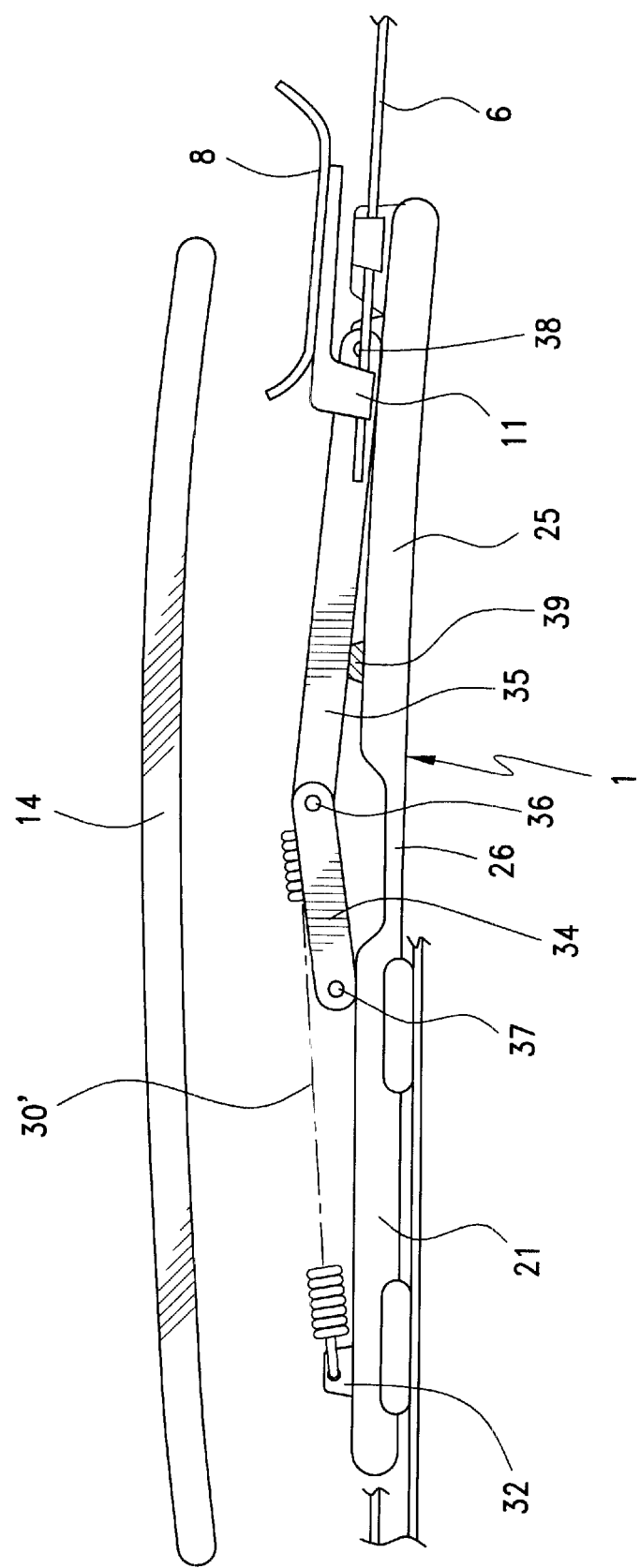
FIG. 3 is a side view of the sliding roof device with a second embodiment of the lifting device in the folded-down closed position of the sliding headliner.
Figure 4:
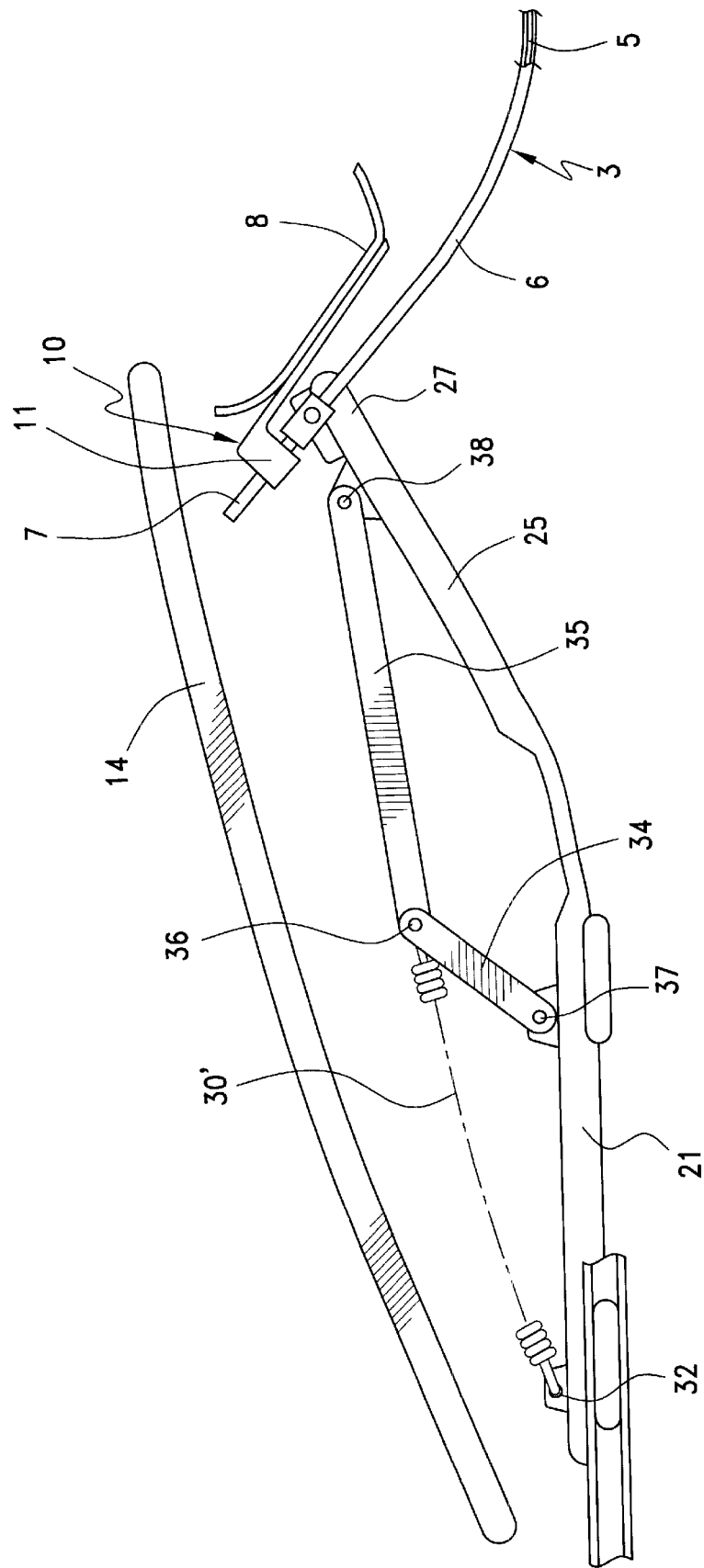
FIG. 4 is a side view of the sliding roof device with the cover raised and the sliding head line folded-up.

A second embodiment of the lifting means (see FIGS. 3 to 5) contains a lifting means with a front shorter lever 34 and a rear longer lever 35 which, on the one hand, are pivotally connected to one another by a hinge axle 36, and on the other hand, are coupled to the front section 21 and the rear section 25 by hinges 37, 38, respectively. A tension spring 30' is connected, on the one hand, on the front holding part 32, and on the other hand, to the hinge axle 36. In the folded down position of the rear section 25 (FIG. 3), the rear lever 35 elastically adjoins a buffer 39 which projects on the top of the rear section 25 and prevents lowering of the rear lever 35 into the dead center position with respect to the front lever 34. The hinge axle 36 is this located slightly above the connecting line between the hinges 37, 38. In this position, the tension spring 30' is maximally expanded, but the maximum spring tension force acts only in minimum strength as a lifting force which is directed upward on the rear hinge 37, since the spring tension force transferred by the rear lever 35 is delivered almost parallel to the rear section 25.

The length and position of the short front lever 34 is coordinated, for example, such that, in the folded-up position of the rear section 25 (FIG. 4), the tension spring 30' and the rear lever 35 lie roughly on a straight line.

What is claimed is:

1. Sliding roof device for a motor vehicle roof comprising:
   a movable cover for selectively closing and at least partially exposing a roof opening in the motor vehicle roof, the movable cover being raisable at a rear edge thereof into a ventilation position,
   a sliding headliner movably located underneath the cover, a rear section of the sliding headliner being raisable from a lowered position in which the rear section is in a common plane with a front section of the sliding headliner into a folded-up position for producing a ventilation gap when the sliding headliner is positioned under the cover in the ventilation position thereof,
   a lifting mechanism which engages the rear section of the sliding headliner and which exerts a lifting force that pretensions the rear section in a direction into said folded-up position, and
   an upwardly curvable guideway which cooperates with the lifting mechanism to guide the rear section of the sliding headliner between the lowered position and the folded-up position.

2. Sliding roof device as claimed in claim 1, wherein the lifting mechanism is constructed and arranged to exert a maximum lifting force on said rear section in said folded-up position and minimum lifting force when the rear section is in said lowered position in a common plane with said front section of the sliding headliner.

3. Sliding roof device as claimed in claim 2, wherein the lifting mechanism is constructed and arranged to cause the lifting force exerted thereby to increase continuously as the rear section is fold-up from said lowered position to said folded-up position.

4. Sliding roof device as claimed in claim 3, wherein a front section of the sliding headliner is guided on a guideway for sliding movement in a displacement plane.

5. Sliding roof device as claimed in claim 4, wherein the lifting mechanism connects the front section and the rear section of the sliding headliner on a top side of the sliding headliner and comprises a spring arrangement for applying said lifting force to the rear section.

6. Sliding roof device as claimed in claim 5, wherein the lifting mechanism comprises a lever mechanism with a front lever and a rear lever which are pivotally coupled to the front section and to the rear section of the sliding headliner at respective distally located ends thereof and are pivotally connected to one another by a hinge axle at proximal ends thereof, and wherein the spring arrangement comprises a tension spring that connects one of the rear lever and the hinge axle to the front section.

7. Sliding roof device as claimed in claim 1, wherein a front section of the sliding headliner is guided on a guideway for sliding movement in a displacement plane.

8. Sliding roof device as claimed in claim 1, wherein the lifting mechanism connects a front section of the sliding headliner and the rear section of the sliding headliner on a top side of the sliding headliner and comprises a spring arrangement for applying said lifting force to the rear section.

9. Sliding roof device as claimed in claim 8, wherein the lifting mechanism comprises a lever mechanism with a front lever and a rear lever which are pivotally coupled to the front section and to the rear section of the sliding headliner at respective distally located ends thereof and are pivotally connected to one another by a hinge axle at proximal ends thereof, and wherein the spring arrangement comprises a tension spring that connects one of the rear lever and the hinge axle to the front section.

* * * * *